US012762837B2

(12) United States Patent
Tajimi et al.

(10) Patent No.: US 12,762,837 B2
(45) Date of Patent: Oct. 13, 2026

(54) IMAGE PROCESSING DEVICE, IMAGE PROCESSING SYSTEM, IMAGE PROCESSING METHOD, AND PROGRAM

(71) Applicant: MAXELL, LTD., Kyoto (JP)

(72) Inventors: Go Tajimi, Tokyo (JP); Kouta Suzuki, Tokyo (JP)

(73) Assignee: MAXELL, LTD., Kyoto (JP)

( * ) Notice: Subject to any disclaimer, the term of this patent is extended or adjusted under 35 U.S.C. 154(b) by 307 days.

(21) Appl. No.: 18/561,325

(22) PCT Filed: Jun. 1, 2022

(86) PCT No.: PCT/JP2022/022383
§ 371 (c)(1),
(2) Date: Nov. 16, 2023

(87) PCT Pub. No.: WO2022/255418
PCT Pub. Date: Dec. 8, 2022

(65) Prior Publication Data
US 2024/0242478 A1 Jul. 18, 2024

(30) Foreign Application Priority Data
Jun. 2, 2021 (JP) ................................ 2021-092985

(51) Int. Cl.
*G06V 10/764* (2022.01)
*G06V 10/94* (2022.01)

(52) U.S. Cl.
CPC ............ *G06V 10/764* (2022.01); *G06V 10/94* (2022.01)

(58) Field of Classification Search
CPC ............................ G06V 10/764; G06V 10/94
See application file for complete search history.

(56) References Cited

U.S. PATENT DOCUMENTS 10,713,794 B1 * 7/2020 He ......................... G06V 10/25
10,929,978 B2 * 2/2021 Aoba ..................... G06V 10/82
(Continued)

FOREIGN PATENT DOCUMENTS

EP 3975112 A1 3/2022
JP 2015-082245 A 4/2015
(Continued)

OTHER PUBLICATIONS

International Search Report received in corresponding Application No. PCT/JP2022/022383, dated Aug. 23, 2022, 4 pages.
(Continued)

*Primary Examiner* — Utpal D Shah
(74) *Attorney, Agent, or Firm* — Dority & Manning, P.A.

(57) ABSTRACT

An image processing device that detects, by image processing, types of objects included in an image and positional coordinates at which the objects are located, the image processing device being provided with a correspondence information acquisition unit that acquires a first correspondence information group including multiple items of correspondence information in which positional coordinates indicating ranges in which objects are predicted to be located in the image are associated with likelihoods of classes, among multiple predefined classes, corresponding to the ranges; a settings information acquisition unit that acquires settings information relating to the image processing; an extraction unit that extracts, based on the acquired first correspondence information group and the acquired settings information, a second correspondence information group including at least one or more likely classes and positional information corresponding to the likely classes; and an output unit that outputs the extracted second correspondence information group.

10 Claims, 8 Drawing Sheets

(56) References Cited

U.S. PATENT DOCUMENTS

| | | | | |
|---|---|---|---|---|
| 2015/0109474 | A1 | 4/2015 | Saruta | |
| 2016/0140414 | A1* | 5/2016 | Pham | G06F 18/231 382/165 |
| 2017/0169313 | A1* | 6/2017 | Choi | G06V 10/82 |
| 2018/0068032 | A1* | 3/2018 | Levy | H04L 45/7453 |
| 2019/0220014 | A1* | 7/2019 | Bradley | G06V 20/58 |
| 2019/0294881 | A1* | 9/2019 | Polak | G06N 3/0442 |
| 2019/0332898 | A1* | 10/2019 | Saruta | G06V 10/82 |
| 2021/0174149 | A1* | 6/2021 | Zhou | G06F 18/214 |
| 2021/0297678 | A1* | 9/2021 | Qin | G06T 7/194 |
| 2022/0055618 | A1* | 2/2022 | Toyoda | B60W 40/04 |
| 2022/0172376 | A1* | 6/2022 | Su | G06V 10/25 |
| 2023/0072730 | A1* | 3/2023 | Yin | G06N 3/09 |

FOREIGN PATENT DOCUMENTS

| | | | |
|---|---|---|---|
| JP | 2016-095640 | A | 5/2016 |
| JP | 2020-205039 | A | 12/2020 |
| WO | WO 2020/235269 | A1 | 11/2020 |

OTHER PUBLICATIONS

Office Action (w/ English translation) in corresponding JP Application No. 2025-086928, dated Apr. 1, 2026, in 6 pgs.

* cited by examiner

IMAGE PROCESSING DEVICE, IMAGE PROCESSING SYSTEM, IMAGE PROCESSING METHOD, AND PROGRAM

TECHNICAL FIELD

The present invention relates to an image processing device, an image processing system, an image processing method, and a program.

The present application is a U.S. national phase entry of International Patent Application No. PCT/JP2022/022383, filed Jun. 1, 2022, which, in turn, claims priority to Japanese Patent Application No. 2021-092985, filed on Jun. 2, 2021, the contents of both of which are incorporated herein by reference.

BACKGROUND ART

Conventionally, in technical fields in which objects included in images are detected, there was technology for detecting, by means of image processing, the types of objects appearing in the images and the ranges in the images in which the objects are located. In such technical fields, for example, technologies for increasing the speed of object detection are known (see, for example, Patent Document 1).

CITATION LIST

Patent Documents

[Patent Document 1] JP 2020-205039 A

SUMMARY OF INVENTION

Technical Problem

In this case, it is known that there is a tradeoff relationship between the processing speed and the object detection accuracy. That is, if the resolution of an image to be processed is high, then a long time is required for processing. Additionally, if the number of detectable objects increases, then a long time is required for processing.

According to the technology mentioned above, there were problems in that the object detection accuracy became worse as the processing speed was raised. Additionally, there were problems in that, when the object detection accuracy was raised, the processing speed became slower.

Therefore, an objective of the present invention is to provide an image processing technology that can detect the types and ranges of objects included in images with an appropriate processing speed and accuracy.

Solution to Problem

An image processing device according to an embodiment of the present invention is an image processing device that detects, by image processing, types of objects included in an image and positional coordinates at which the objects are located, the image processing device being provided with a correspondence information acquisition unit that acquires a first correspondence information group including multiple items of correspondence information in which positional coordinates indicating ranges in which objects are predicted to be located in the image are associated with likelihoods of classes, among multiple predefined classes, corresponding to the ranges; a settings information acquisition unit that acquires settings information relating to the image processing; an extraction unit that extracts, based on the acquired first correspondence information group and the acquired settings information, a second correspondence information group including at least one or more likely classes and positional information corresponding to the likely classes; and an output unit that outputs the extracted second correspondence information group.

Additionally, in the image processing device according to an embodiment of the present invention, the settings information includes at least information indicating either a first setting for prioritizing accuracy of the classes and the positional coordinates extracted by the extraction unit, or a second setting for prioritizing a processing speed of the extraction unit.

Additionally, in the image processing device according to an embodiment of the present invention, in the process by which the extraction unit extracts the second correspondence information group, the number of the classes to be computed when the settings information indicates the second setting is less than the number of the classes to be computed when the settings information indicates the first setting.

Additionally, in the image processing device according to an embodiment of the present invention, the extraction unit is further provided with a switching unit that, based on the settings information, switches between a first computation unit that performs computations for extracting the second correspondence information group when the settings information indicates the first setting and a second computation unit that performs computations for extracting the second correspondence information group when the settings information indicates the second setting.

Additionally, in the image processing device according to an embodiment of the present invention, the extraction unit is further provided with a compression unit that, by a prescribed method, compresses the classes included in the first correspondence information group to specific classes; and the first computation unit or the second computation unit performs computations for extracting the second correspondence information group based on the compressed correspondence information.

Additionally, in the image processing device according to an embodiment of the present invention, the compression unit compresses the correspondence information included in the first correspondence information group when there is a prescribed value or fewer of classes for which the likelihoods of the multiple items of correspondence information included in the first correspondence information group is a prescribed value or higher.

Additionally, in the image processing device according to an embodiment of the present invention, the switching unit is switched based on the settings information when the image processing device is activated.

Additionally, in the image processing device according to an embodiment of the present invention, the settings information acquisition unit acquires the settings information from a settings file.

Additionally, in the image processing device according to an embodiment of the present invention, the settings information acquisition unit acquires the settings information based on the first correspondence information group acquired by the correspondence information acquisition unit.

Additionally, an image processing system according to an embodiment of the present invention is provided with a preprocessing device that calculates a first correspondence information group including multiple items of correspondence information in which positional coordinates indicating ranges in which objects are predicted to be located in the image are associated with likelihoods of classes, among multiple predefined classes, corresponding to the ranges; and the image processing device according to any one of claim 1 to claim 9, which acquires the first correspondence information group from the processing device.

Additionally, an image processing method according to an embodiment of the present invention is an image processing method for detecting, by image processing, types of objects included in an image and positional coordinates at which the objects are located, the image processing method having a correspondence information acquisition step of acquiring a first correspondence information group including multiple items of correspondence information in which positional coordinates indicating ranges in which objects are predicted to be located in the image are associated with likelihoods of classes, among multiple predefined classes, corresponding to the ranges; a settings information acquisition step of acquiring settings information relating to the image processing; an extraction step of extracting, based on the acquired first correspondence information group and the acquired settings information, a second correspondence information group including at least one or more likely classes and positional information corresponding to the likely classes; and an output step of outputting the extracted second correspondence information group.

Additionally, a program according to an embodiment of the present invention is a program for detecting, by image processing, types of objects included in an image and positional coordinates at which the objects are located, the program making a computer execute a correspondence information acquisition step of acquiring a first correspondence information group including multiple items of correspondence information in which positional coordinates indicating ranges in which the objects are predicted to be located in the image are associated with likelihoods of classes, among multiple predefined classes, corresponding to the ranges; a settings information acquisition step of acquiring settings information relating to the image processing; an extraction step of extracting, based on the acquired first correspondence information group and the acquired settings information, a second correspondence information group including at least one or more likely classes and positional information corresponding to the likely classes; and an output step of outputting the extracted second correspondence information group.

Advantageous Effects of Invention

According to the present invention, the types and ranges of objects included in images can be detected with an appropriate processing speed and accuracy.

DESCRIPTION OF EMBODIMENTS

Hereinafter, an embodiment of the present invention will be explained with reference to the drawings. The embodiment explained below is merely one example, and the embodiments to which the present invention is applied are not limited to the embodiment below.

The present embodiment will be explained under the assumption that there is a tradeoff relationship between the object detection accuracy and the processing speed. In this case, there are cases in which the object detection accuracy has a tradeoff relationship not only with the processing speed, but also with power consumption, necessary resources, etc. In the explanation below, among the performance indices for which there is a tradeoff with the object detection accuracy, an example for the case of processing speed will be explained. However, this example does not limit the present invention, and multiple performance indices having a tradeoff relationship with the object detection accuracy are included.

[Summary of Image Processing System]

Figure 1:
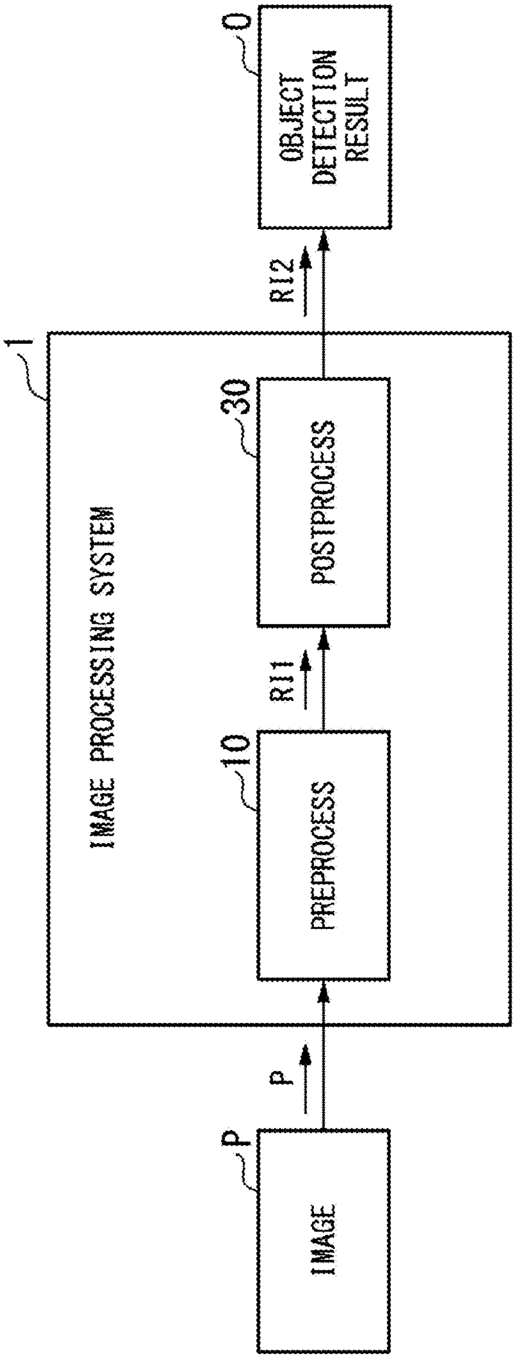
FIG. 1 is a diagram for explaining the functional configuration of an image processing system according to an embodiment.

FIG. 1 is a diagram for explaining the functional configuration of an image processing system according to an embodiment. An image processing system 1 according to the embodiment will be explained with reference to said drawing.

The image processing system 1 detects, by image processing, based on an input image P, the type of an object included in the image P, and the positional coordinates of a range in which said object is located. The image processing system 1 outputs object detection results O as a result of the image processing. The object detection results O include the type of the object included in the image P and the positional coordinates of the range in which the object is located. In the case in which there are multiple objects in the image P, the object detection results O include the types of the multiple objects included in the image P and the positional coordinates of the ranges in which the respective objects are located.

The image processing in the present embodiment includes, as one example, a machine learning process. In particular, as one embodiment, a deep learning network (DNN) that repeatedly performs convolution operations with prescribed weights in multiple processing layers may be included.

In this case, the types of objects included in the image P are also described as classes. The types of classes that are detectable by the image processing system 1 may be predefined. In the present embodiment, the image processing system 1 is described as being pretrained regarding detectable classes. The classes may specifically be animals such as humans and dogs, objects such as automobiles and bicycles, and natural objects such as clouds and the sun.

The image processing system 1 includes a preprocess 10 and a postprocess 30. The image processing system 1 calculates candidates for types of objects included in an input image P and candidates for positional coordinates at which the objects are located by means of DNNs included in the preprocess 10, and extracts likely classes and positional coordinates among the calculated candidates. In the case in which the image processing system 1 includes DNNs, they may be trained models that acquire various parameters by being trained. Although the image processing system 1 can be realized by a processor executing various programs stored in a non-volatile memory, some of the processes in the preprocess 10 or the postprocess 30 may be implemented in the form of a hardware accelerator.

The number of pixels in the image P input to the image processing system 1 is preferably a number of pixels that is based on processing units by which the preprocess implements processing. The processing units of the preprocess 10 are also described as elemental matrices. The preprocess 10 divides the number of pixels in an image P into elemental matrices and implements the processing by each elemental matrix. For example, in the case in which the size of an elemental matrix is 16×12 [px (pixels)] and the number of pixels in the image P is 256×192 [px], the preprocess 10 divides the image P into 256 sections and implements the processing separately for each 16×12 [px] elemental matrix.

The number of pixels in the image P that can be processed by the image processing system 1 does not need to depend on the size of the elemental matrices. Even if the number of pixels in the image P is an arbitrary value, for example, the preprocess can implement processing by converting the number of pixels in the image P to a number of pixels based on the size of the elemental matrices by means of the preprocess or by means of a prescribed process performed before the image P is input to the preprocess 10.

For example, the case in which image processing is performed by software processing before the image P is input to the preprocess 10 will be explained. Software processing before the image P is input to the preprocess 10 broadly includes processing for improving image quality, processing of the image itself, other types of data processing, etc. The processing for improving image quality may be brightness/color conversion, black level adjustment, noise improvement, correction of optical aberrations, etc. The processing of the image itself may by processing to cut out, enlarge, reduce, deform, etc. the image. The other data processing may be data processing, etc. such as tone reduction, compressive coding/decoding, or data replication.

The preprocess 10, for each elemental matrix, calculates the likelihoods of positional coordinates indicating ranges in which objects are predicted to be located and classes corresponding to said positional coordinates. The ranges of the positional coordinates calculated by the preprocess 10 are larger than the elemental matrices. That is, the preprocess 10 considers the entire image P, associates ranges in which objects are predicted to be located with respective elemental matrices, and calculates the positional coordinates of the ranges. The positional coordinates are indicated in a form allowing the ranges to be specified with the respective elemental matrices as reference points. The respective elemental matrices are associated with a likelihood for each class. That is, a number of likelihoods corresponding to the number of classes to be computed is associated with each elemental matrix.

Information in which the positional coordinates indicating the ranges in which objects are predicted to be located in an image are associated with likelihoods of classes, among predefined classes, corresponding to said ranges is also referred to as correspondence information. The preprocess 10 calculates, based on the image P, a number of items of correspondence information that is in accordance with the number of elemental matrices. Multiple items of correspondence information calculated by the preprocess 10 are also described as a first correspondence information group RI1. That is, the preprocess 10 calculates the first correspondence information group RI1 including multiple items of correspondence information.

The preprocess 10 is also described as a preprocessing device.

All or some of the functions of the preprocess 10 can specifically be implemented by a deep learning accelerator that is realized by using hardware such as an ASIC (Application-Specific Integrated Circuit), a PLD (Programmable Logic Device) or an FPGA (Field-Programmable Gate Array). By realizing each of the functions of the preprocess 10 by means of hardware, processes for calculating candidates for types of objects included in the image P and candidates for positional coordinates at which the objects are located can be implemented at high speed.

The computational processes of DNNs included in the preprocess 10 require repeatedly performing many computations in accordance with the number of elemental matrices for each of the multiple layers that are included. Meanwhile, since the specific computations are often limited and have little dependence on the application, it is more preferable to apply computational processes using accelerators with fast processing speeds than to perform the program processes on highly flexible processors.

The postprocess 30 detects the types of objects included in an image and the positional coordinates at which the objects are located by means of image processing based on the first correspondence information group RI1 calculated by the preprocess 10. Specifically, the postprocess 30 first acquires the first correspondence information group RI1 from the preprocess 10. The postprocess 30 calculates the second correspondence information group RI2 based on the acquired first correspondence information group RI1. The second correspondence information group RI2 is information including, of the information included in the first correspondence information group RI1, at least one or more likely classes and positional information corresponding to the likely classes.

The postprocess 30 is also referred to as an image processing device.

Some or all of the functions of the postprocess 30 may specifically be realized by using a CPU (Central Processing Unit) and a storage device such as a ROM (Read-Only Memory) or a RAM (Random Access Memory), etc., not illustrated, connected by a bus. The postprocess 30 functions as a device provided with the functions of the postprocess 30 by executing an image processing program. The image processing program may be recorded on a computer-readable recording medium. A computer-readable recording medium is, for example, a portable medium such as a flexible disc, a magneto-optic disc, a ROM, or a CD-ROM, or a storage device such as a hard disk inside a computer system. The image processing program may be transmitted across an electrical communication line.

The specific computations included in the postprocess 30 are more highly dependent on the application than those in the preprocess 10. Furthermore, since the processes must be switched based on settings by the user or by a desired application, the program processes are preferably performed on a highly flexible processor. There is no need for all of the processes in the postprocess 30 to be program processes, and some of the processes may be processed on an accelerator.

Figure 2:
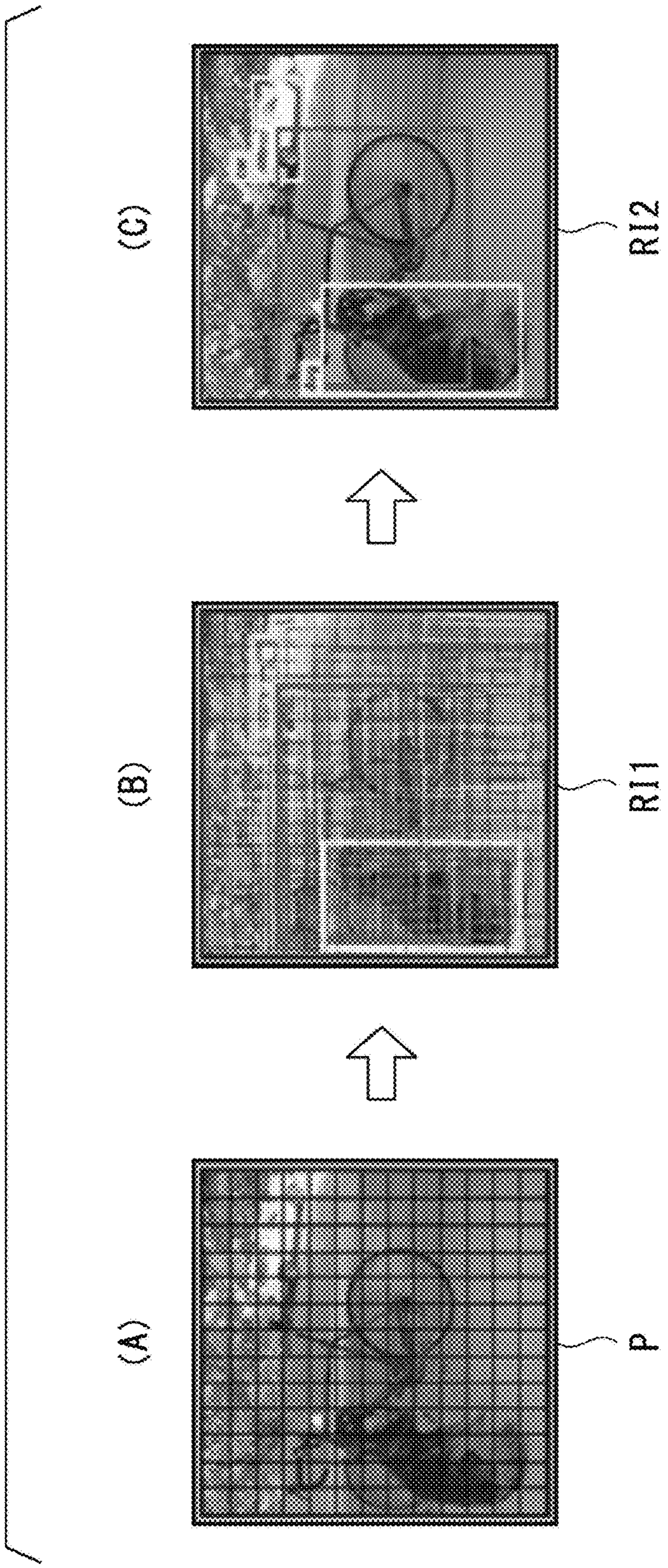
FIG. 2 is a diagram for explaining a summary of the image processing system according to an embodiment.

FIG. 2 is a diagram for explaining a summary of an image processing system according to an embodiment. The processes in the image processing system 1 according to an embodiment will be explained with reference to said drawing. FIG. 2(A) indicates elemental matrices in a stage before being processed by the preprocess 10, FIG. 2(B) indicates a first correspondence information group RI1 calculated by the preprocess 10, and FIG. 2(C) indicates a second correspondence information group RI2 calculated by the postprocess 30.

First, referring to FIG. 2(A), elemental matrices in a stage before being processed by the preprocess 10 will be explained. Said diagram is an example of the case in which the image P is divided into a total of 169 elemental matrices arranged in thirteen vertical columns and thirteen horizontal rows. In this example, the number of pixels in the input image is, for example, 208×156 [px], and the size of the elemental matrices is 16×12 [px].

The preprocess 10 implements processing separately for each elemental matrix. The preprocess 10, based on the pixel information of each elemental matrix and the pixel information of the image P overall, calculates candidates for the types of objects included in the image P and candidates for the positional coordinates indicating the ranges in which the objects are located.

Next, the first correspondence information group RI1 calculated by the preprocess 10 will be explained with reference to FIG. 2(B). As illustrated in FIG. 2(B), in the first correspondence information group RI1, multiple ranges are indicated by boxes associated with elemental matrices. Each box indicates a candidate for a range in which some sort of object is located. Additionally, likelihoods of belonging to classes to be computed are associated with the respective boxes. In the case in which there are multiple classes to be computed, likelihoods of belonging to multiple classes are associated with each box.

Next, the second correspondence information group RI2 calculated by the postprocess 30 will be explained with reference to FIG. 2(C). As illustrated in FIG. 2(C), in the second correspondence information group RI2, a likely range is identified among the multiple ranges calculated by the preprocess 10. Additionally, a specific class is associated with each range. That is, the postprocess 30 identifies likely candidates from among multiple boxes included in the first correspondence information group RI1 and one or more classes corresponding to the respective boxes.

[Functional Configuration of Postprocess]

Figure 3:
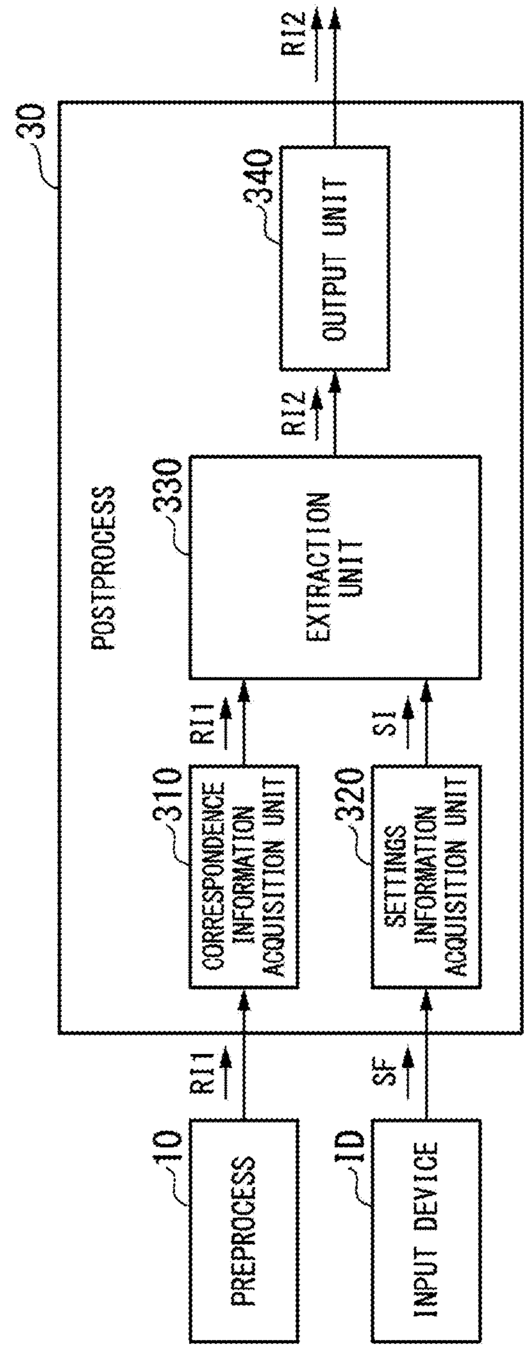
FIG. 3 is a block diagram for explaining an example of the functional configuration of a postprocess according to an embodiment.

FIG. 3 is a block diagram for explaining an example of the functional configuration of the postprocess according to an embodiment. The functional configuration of the postprocess 30 will be explained with reference to said drawing. The postprocess 30, in addition to acquiring a first correspondence information group RI1 from the preprocess 10, acquires a settings file SF from an input device ID. The input device ID may be an input device such as a touch panel, a mouse, or a keyboard, or may be an information recording medium, etc. such as a USB memory. The settings file SF may be an electronic file including prescribed settings information.

The postprocess 30 includes a correspondence information acquisition unit 310, a settings information acquisition unit 320, an extraction unit 330, and an output unit 340.

In the present embodiment, an example in which the input device ID is used to acquire the settings file SF has been indicated. However, the invention is not limited thereto. For example, the settings file SF may be acquired based on the time or with a prescribed periodicity, or the settings file SF may be acquired based on the first correspondence information group RI1 or the second correspondence information group RI2.

The correspondence information acquisition unit 310 acquires the first correspondence information group RI1 from the preprocess 10. The first correspondence information group RI1 includes multiple items of correspondence information. The correspondence information is information in which positional coordinates indicating ranges in which objects are predicted to be located in the image P are associated with likelihoods of classes, among multiple predefined classes, corresponding to the ranges in which the objects are predicted to be located. That is, the postprocess 30 acquires a first correspondence information group including multiple items of correspondence information in which positional coordinates indicating ranges in which objects are predicted to be located in the image are associated with likelihoods of classes, among multiple predefined classes, corresponding to those ranges.

The settings information acquisition unit 320 acquires settings information SI from the input device ID. The settings information SI is information included in the settings file SF, which is information relating to image processing. That is, the settings information acquisition unit 320 acquires settings information SI relating to image processing included in the settings file SF.

Additionally, the settings information SI includes information for setting whether to prioritize the detection accuracy of the classes and positional coordinates (accuracy prioritization) or whether to prioritize processing speed (speed prioritization). The accuracy prioritization setting will also be indicated as a first setting and the speed prioritization setting will also be indicated as a second setting. Specifically, the first setting is for prioritizing the accuracy of the classes and positional coordinates extracted by the extraction unit 330 and the second setting is for prioritizing the processing speed of the extraction unit 330. That is, the settings information includes at least information indicating either the first setting for prioritizing the accuracy of the classes and the positional coordinates extracted by the extraction unit 330 or the second setting for prioritizing the processing speed of the extraction unit 330.

The settings information SI acquired by the settings information acquisition unit 320 may be derived from the first correspondence information group RI1 calculated by the preprocess 10. For example, in the case in which the classes with high likelihoods are limited among the classes included in the first correspondence information group RI1 calculated by the preprocess 10, the settings information SI may be configured so as to prioritize speed and to limit the classes to those with high likelihoods. In this case, since computations are not performed for classes with low likelihoods, there is a risk that the detection accuracy will become lower. However, the processing speed can be raised.

That is, in this example, the settings information acquisition unit 320 acquires the settings information SI based on the first correspondence information group RI1 acquired by the correspondence information acquisition unit 310.

The extraction unit 330 acquires the first correspondence information group RI1 from the correspondence information acquisition unit 310, and acquires the settings information SI from the settings information acquisition unit 320. The extraction unit 330 extracts the second correspondence information group RI2 based on the first correspondence information group RI1 and the settings information SI that have been acquired. The second correspondence information group RI2 includes at least one or more likely classes and positional information corresponding to the likely classes. That is, the extraction unit 330 extracts the second correspondence information group RI2 including at least one or more of a likely class and positional information corresponding to the likely class based on the first correspondence information group RI1 acquired by the correspondence information acquisition unit 310 and the settings information acquired by the settings information acquisition unit 320.

The output unit 340 outputs the second correspondence information group RI2 extracted by the extraction unit 330. The output unit 340 outputs the second correspondence information group RI2 by using an image format or a prescribed file format.

Figure 4:
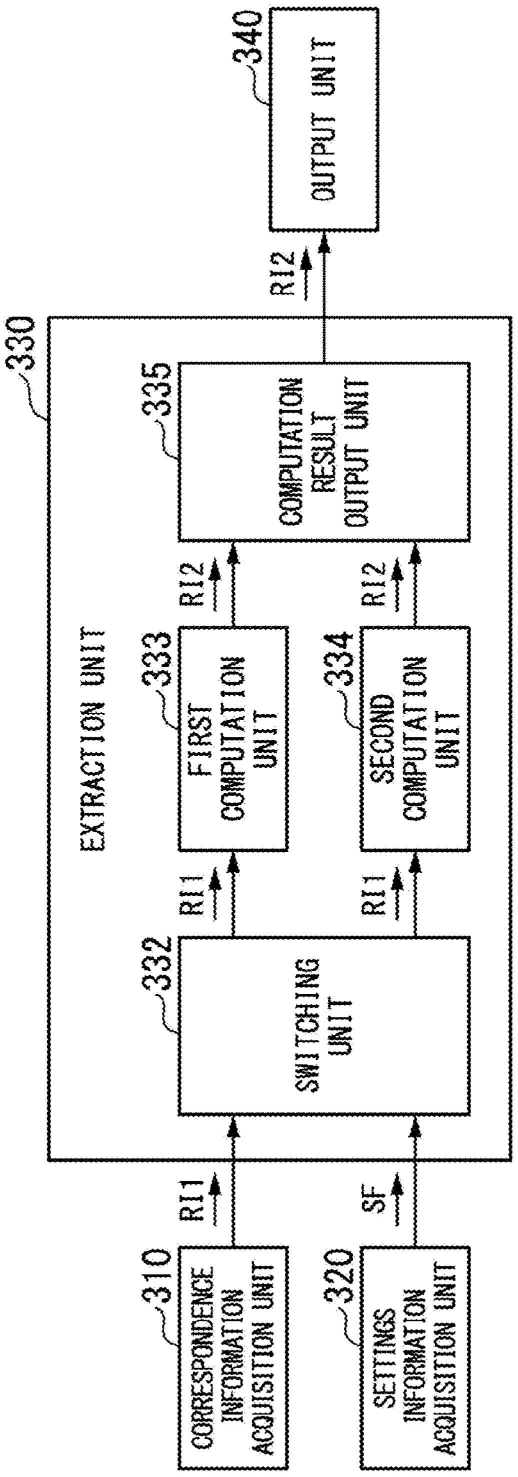
FIG. 4 is a block diagram for explaining an example of the functional configuration of an extraction unit according to an embodiment.

FIG. 4 is a block diagram for explaining an example of the functional configuration of the extraction unit according to an embodiment. The functional configuration of the extraction unit 330 will be explained with reference to said drawing. The extraction unit 330 is provided with a switching unit 332, a first computation unit 333, a second computation unit 334, and a computation result output unit 335.

The first computation unit 333 performs processes for calculating the second correspondence information group RI2 by prioritizing the accuracy of the classes and the positional coordinates. Specifically, the first computation unit 333 identifies classes with high accuracy by extracting likely classes based on the likelihoods of the classes included in the first correspondence information group RI1. Additionally, the first computation unit 333 identifies positional coordinates with high accuracy by performing computations based on the resolution of the first correspondence information group RI1 that has been acquired.

The first computation unit 333 performs computations for extracting the second correspondence information group in the case in which the settings information SI indicates the first setting.

The second computation unit 334 performs a process for calculating the second correspondence information group RI2 by prioritizing the processing speed. Specifically, the second computation unit 334 identifies classes at high speed by extracting likely classes with the likelihoods of classes included in the first correspondence information group RI1 limited to specific classes. Additionally, the second computation unit 334 identifies positional coordinates at high speed by performing computations using a resolution lower than the resolution of the acquired first correspondence information group RI1.

The second computation unit 334 performs computations for extracting the second correspondence information group in the case in which the settings information SI indicates a second setting.

The switching unit 332 switches between whether to implement processing by means of the first computation unit 333 or the second computation unit 334. The switching unit 332, based on the settings information SI, switches to the first computation unit 333 in the case in which the settings information SI indicates the first setting, and switches to the second computation unit 334 in the case in which the settings information SI indicates the second setting. That is, the switching unit 332 switches, based on the settings information SI, between the first computation unit 333 for performing computations for extracting the second correspondence information group RI2 in the case in which the settings information SI indicates the first setting, and the second computation unit 334 for performing computations for extracting the second correspondence information group RI2 in the case in which the settings information SI indicates the second setting.

The accuracy-prioritizing first setting may have many classes to be computed, and the speed-prioritizing second setting may have few classes to be computed. That is, in the processes by which the second correspondence information group RI2 extracts the second correspondence information group RI2, the number of classes to be computed in the case in which the settings information SI indicates the second setting may be fewer than the number of classes to be computed in the case in which the settings information SI indicates the first setting.

The switching unit 332 switches to the first computation unit 333 or to the second computation unit 334 based on the settings information SI at the time the postprocess 30 is activated. Specifically, when the postprocess 30 is realized by software, the settings information SI may be acquired by reading the settings file SF after a resetting process, and the switch may be made to either the first computation unit 333 or the second computation unit 334.

Aside therefrom, the switching unit 332 may switch to the first computation unit 333 or to the second computation unit 334 at an arbitrary timing. The arbitrary timing may, for example, be a timing for switching what is to be detected, etc.

The computation result output unit 335 outputs the second correspondence information group RI2 extracted by the first computation unit 333 or the second computation unit 334 to the output unit 340 as a computation result.

In the present embodiment, an example of the case in which the extraction unit 330 is provided with two computation units, i.e., the first computation unit 333 and the second computation unit 334, was explained. However, the invention is not limited to this example, and the extraction unit 330 may be provided with three or more computation units. Additionally, as another example, in the case in which the extraction unit 330 includes a configuration serially connecting multiple computation units, control may be implemented to bypass and skip some of the connected computation units.

In the case in which the extraction unit 330 is provided with multiple computation units, the respective computation units may have different settings for computing the second correspondence information group RI2. For example, each computation unit may have a different number of classes to be computed or different types of classes depending on whether the detection accuracy or the processing speed is to be prioritized.

Additionally, the multiple computation units may each have different computation methods. For example, a speed-prioritizing computation unit may combine multiple calculations or may skip some calculations in comparison with an accuracy-prioritizing computation unit. The computation units may be configured so as to prioritize accuracy or speed by using different threshold values during calculations.

The threshold values used during calculations will be explained below. Conventionally, the computation results relating to respective bounding boxes could take values in the range $(-\infty, +\infty)$. Therefore, likelihoods were calculated by normalizing the results to values in the range (0, 1) by multiplying a sigmoid function with the computation results. The computed likelihoods were compared with likelihood threshold values. That is, conventionally, likelihoods were calculated by multiplying a sigmoid function with each of multiple calculation results corresponding to respective bounding boxes, and the calculated likelihoods were compared with threshold values. Therefore, conventionally, there were many computations because the sigmoid function was multiplied with each of multiple computation results. When the image processing system 1 is applied to an edge device, there are preferably few computations in order to lighten the processing load.

According to the present embodiment, there is no need to normalize each computation result because, instead of normalizing the computation results each time, computations are performed on the threshold values in advance. The computations on threshold values may, for example, involve multiplying an inverse function of the function used for normalization. As a specific example, instead of multiplying a sigmoid function with computation results relating to each bounding box, a logit function, which is the inverse of a sigmoid function, is multiplied with the likelihood threshold values in advance, and the likelihood threshold values multiplied with the logit functions are compared with the computation results relating to each bounding box. That is, according to the present embodiment, the threshold values for determining the likelihoods can be determined by means of computations, etc. performed in advance. Therefore, by applying prescribed function values (e.g., an inverse function of the function used for normalization) to said threshold values, computations do not need to be performed for each of the multiple computation results corresponding to the respective bounding boxes. Thus, according to the present embodiment, the processing load can be lightened. Specifically, in the case in which the preprocess 10 is configured from hardware, the circuit size can be made smaller. Since the circuit size of the preprocess 10 can be made smaller, in the case in which the image processing system 1 is applied to an edge device, the processing load can be lightened, and furthermore, the product size can be made smaller.

In the present embodiment, the computations on the threshold values are not limited to multiplying an inverse function of the function used for normalization, and for example, computations may be performed to multiply a prescribed scaling factor with the threshold values, or to add offset values.

[Series of Operations of Postprocess]

Figure 5:
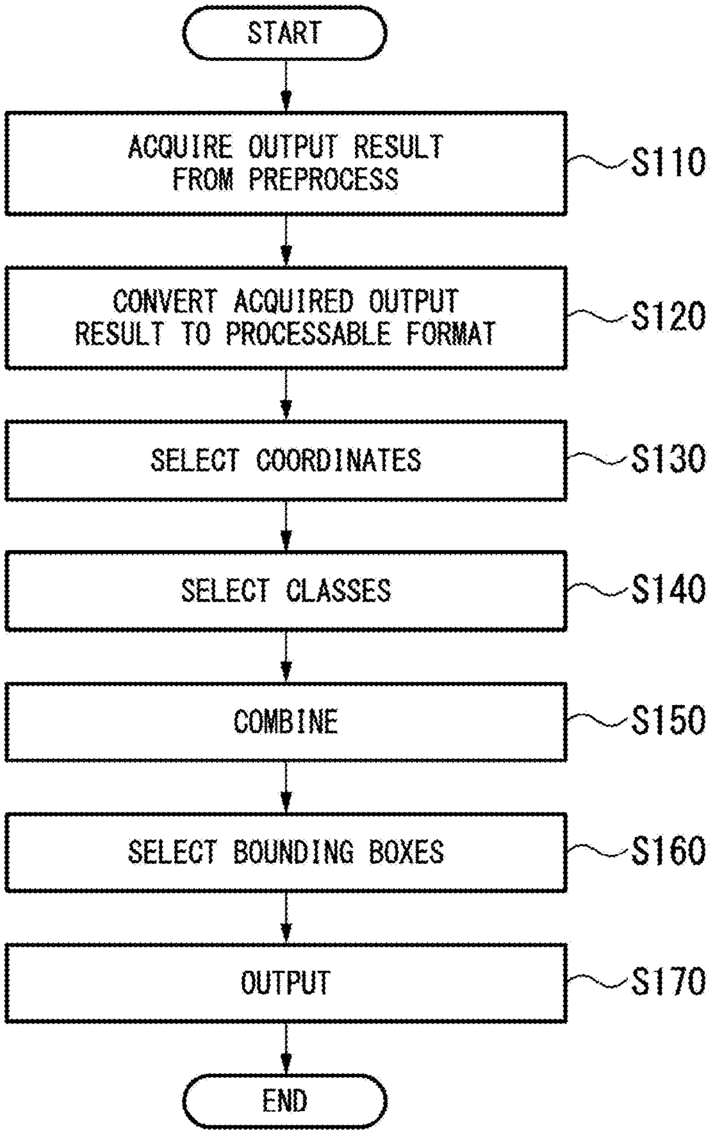
FIG. 5 is a flow chart for explaining an example of a series of operations in a postprocess according to an embodiment.

FIG. 5 is a flow chart for explaining an example of a series of operations in a postprocess according to the embodiment. An example of the series of operations in the postprocess 30 will be explained with reference to said drawing.

(Step S110) The correspondence information acquisition unit 310 acquires a first correspondence information group RI1, which is an output result from a preprocess 10. The correspondence information acquisition unit 310 may acquire information obtained by converting the first correspondence information group RI1 to a prescribed format that can be processed by the postprocess 30.

(Step S120) The postprocess 30 converts the acquired first correspondence information group RI1 to a format processable by the postprocess 30 by means of a conversion unit, not illustrated. For example, the conversion unit performs a process to return the acquired first correspondence information group RI1 to a higher-order API.

(Step S130) The extraction unit 330 selects likely coordinates based on candidates for positional coordinates at which objects are located, included in the acquired first correspondence information group RI1. The positional coordinates at which objects are located will also be referred to as bounding boxes. That is, the first correspondence information group RI1 includes multiple bounding box candidates, and the extraction unit 330 extracts likely bounding boxes from among the multiple bounding box candidates. The extraction unit 330 extracts the likely bounding boxes, for example, by combining or deleting the multiple bounding box candidates by methods such as NMS (Non-Maximum Suppression).

(Step S140) The extraction unit 330 identifies classes corresponding to the extracted bounding boxes based on the likelihoods included in the acquired first correspondence information group RI1. For example, the extraction unit 330 identifies the classes corresponding to bounding boxes by comparing the likelihoods included in the first correspondence information group RI1 with prescribed threshold values, or by ranking the likelihoods, then identifying the highly ranked classes by means of a prescribed method.

(Step S150) The processes performed in step S130 and in step S140 are performed separately for each elemental matrix. After step S130 and step S140 have been performed for all of the elemental matrices in the image P, the extraction unit 330 combines the processes performed for each elemental matrix. The extraction unit 330, as a result of the combination, generates bounding boxes and likelihoods for the image P overall.

(Step S160) The extraction unit 330 extracts likely bounding boxes from among the combined bounding boxes, and extracts classes associated with the extracted boundaries. The classes are extracted based on the likelihoods after combination.

(Step S170) The output unit 340 outputs the positional coordinates of the extracted bounding boxes and the classes associated with the bounding boxes.

[Modified Example of Extraction Unit]

Figure 6:
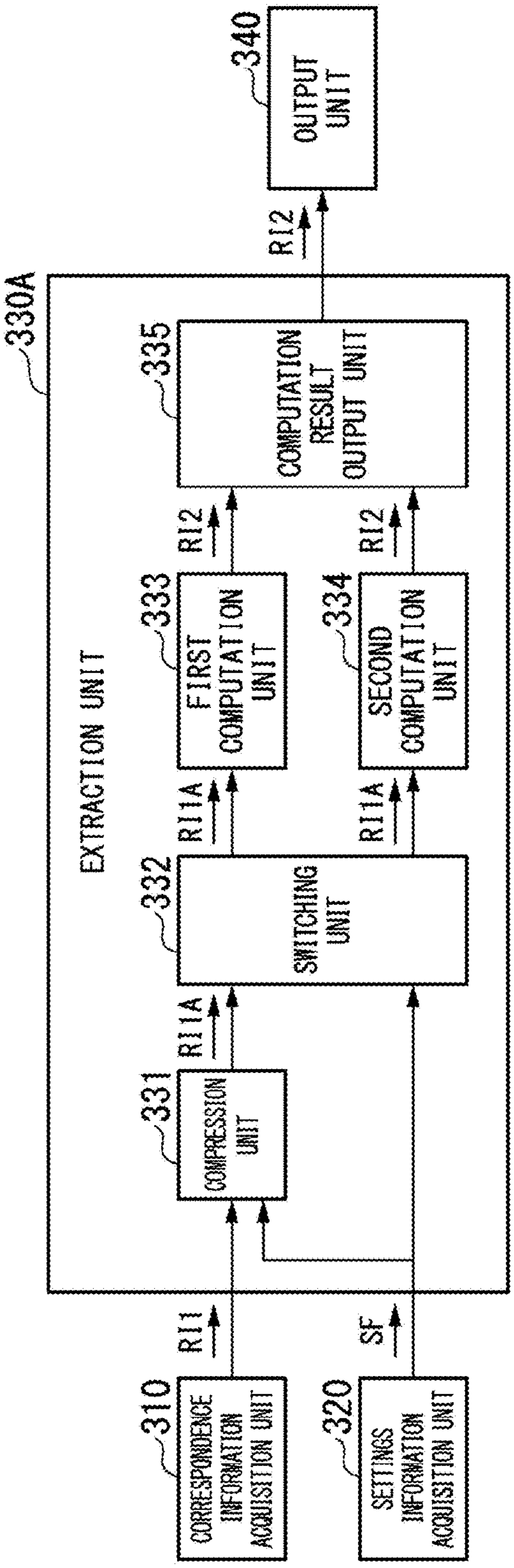
FIG. 6 is a block diagram for explaining a modified example of the functional configuration of the extraction unit according to an embodiment.

FIG. 6 is a block diagram for explaining a modified example of the functional configuration of the extraction unit according to an embodiment. The extraction unit 330A, which is a modified example of the extraction unit 330, will be explained with reference to said drawing. The extraction unit 330A differs from the extraction unit 330 in that a compression unit 331 is provided. The features of the extraction unit 330 that have already been explained will sometimes be omitted and assigned the same reference numbers.

The compression unit 331 compresses the sizes of the elemental matrices in the first correspondence information group RI1 based on the settings information SI. For example, compression is performed so as to extract likely classes by limiting the likelihoods of classes included in the first correspondence information group RI1 to specific classes or to the classes with the highest likelihoods. At this time, the compression unit 331, by using a method such as max pooling, combines or deletes multiple bounding box candidates, for example, by a method such as NMS (Non-Maximum Suppression). That is, the compression unit 331 compresses the classes included in the first correspondence information group RI1 to specific classes by means of a prescribed method.

In this case, in each elemental matrix, the positional coordinates of bounding boxes are associated with classes. The information associated with each elemental matrix is included in the first correspondence information group RI1 as correspondence information RI. The compression unit 331 may compress the correspondence information RI included in the first correspondence information group RI1.

The first computation unit 333 or the second computation unit 334 performs computations for extracting the second correspondence information group RI2 based on the correspondence information RI compressed by the compression unit 331. High-speed processing can be realized by performing the computations based on the compressed correspondence information RI. Furthermore, by compressing the first correspondence information group RI1 before the postprocess 30, the overall processing load can be largely reduced.

The compression unit 331 may also be included in the conversion unit, not illustrated, explained with reference to FIG. 5.

In addition to making the determination based on the settings information SI, or instead of making the determination based on the settings information SI, the compression unit 331 may determine whether or not to compress the elemental matrices based on the number of classes for which the likelihood of the correspondence information RI included in the first correspondence information group RI1 is a prescribed value or higher. For example, the compression unit 331 compresses the correspondence information RI included in the first correspondence information group RI1 in the case in which there is a prescribed number or fewer of classes for which the likelihoods of the multiple items of correspondence information RI included in the first correspondence information group RI1 is a prescribed value or higher.

[Summary of Imaging System]

Next, an example of an imaging system using the image processing system 1 according to the present embodiment will be explained with reference to FIG. 7 and FIG. 8. The image processing system 1 is configured, for example, to perform image processing of images captured in real time and to feed back the image processing results to the hardware.

In the imaging system explained with reference to FIG. 7 and FIG. 8, images of targets are captured by being provided with an imaging device, the captured images are analyzed by means of the image processing system 1. The imaging system is installed, for example, in a monitoring camera (security camera) that is installed inside or outside a facility such as a store or a public facility, and that monitors the actions of people. Additionally, the imaging system may be installed in the windshield or the dashboard of a vehicle such as an automobile and used as a drive recorder for recording the situation when driving or when an accident occurs. Additionally, the imaging system may be installed in a moving body such as a drone or an AGV (Automated Guided Vehicle).

Figure 7:
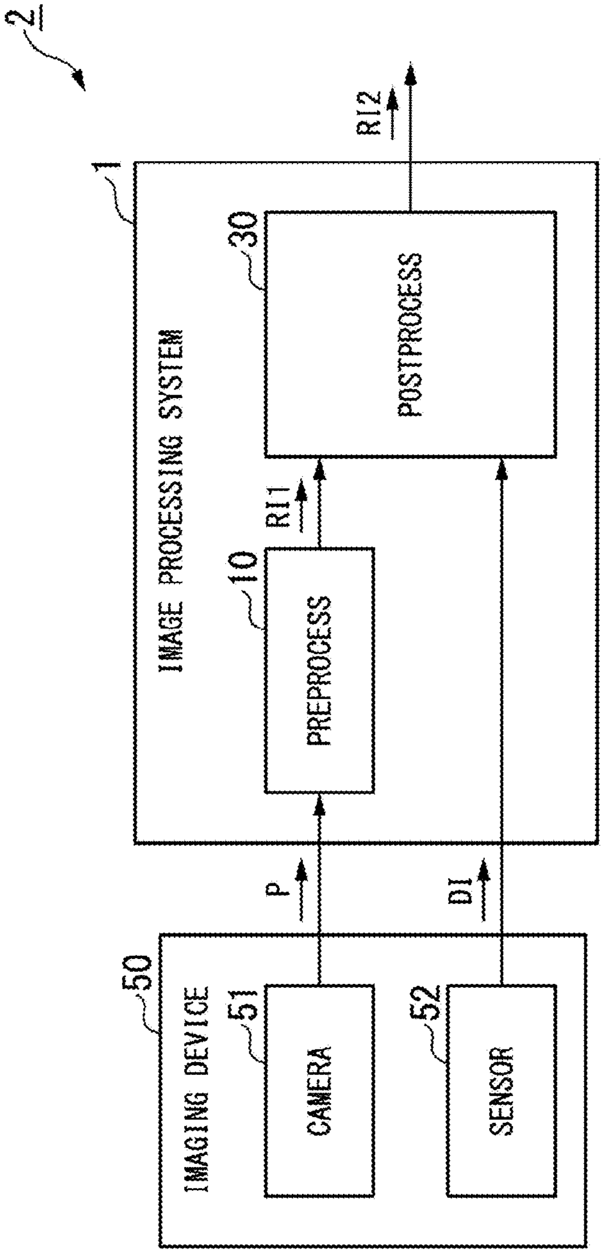
FIG. 7 is a diagram for explaining a summary of an example of an imaging system according to an embodiment.

FIG. 7 is a diagram for explaining a summary of an example of an imaging system according to the embodiment. An example of the imaging system 2 will be explained with reference to said drawing. The imaging system 2 captures images of targets by means of the imaging device and analyzes the captured images by means of the image processing system 1. At this time, the image processing system 1 further performs image processing based on prescribed information obtained from the imaging device 50.

The imaging system 2 is provided with an image processing system 1 and an imaging device 50. The imaging device 50 is provided with a camera 51 and a sensor 52.

The camera 51 captures images of targets. The targets broadly include things that are detectable by image processing, such as animals and objects.

The sensor 52 acquires information indicating the state of the imaging device 50 itself, or acquires information regarding the surroundings of the imaging device 50. The sensor 52 may, for example, be a remaining battery level sensor for detecting the remaining battery level of a battery, not illustrated, provided in the imaging device 50. Additionally, the sensor 52 may be an environmental sensor that detects information regarding the environment surrounding the imaging device 50. The environmental sensor may, for example, be a temperature sensor, a humidity sensor, an illuminance sensor, an atmospheric pressure sensor, a noise sensor, etc. Additionally, in the case in which the image processing system 1 is used on a moving body such as a drone, the sensor 52 may be a sensor for detecting the state of the moving body, i.e., an acceleration sensor, an altitude sensor, etc.

The sensor 52 outputs acquired information, as detection information DI, to the image processing system 1. The detection information DI may be associated with the image P.

The image processing system 1 acquires the image P captured by the camera 51 and the detection information DI detected by the sensor 52. The preprocess 10 calculates a first correspondence information group RI1 based on the image P. The postprocess 30 calculates a second correspondence information group RI2 based on the calculated first correspondence information group RI1 and the detection information DI.

In the present embodiment, the postprocess 30 can perform image processing at an appropriate processing speed and accuracy by calculating the second correspondence information group RI2 based on the detection information DI. That is, in the case in which the sensor 52 is a battery sensor, if the remaining battery level is low based on the battery capacity, the postprocess 30 can lower the accuracy and execute image processing in a mode that does not consume much battery power. In the case in which the sensor 52 is an environmental sensor, the postprocess 30 can execute image processing more efficiently by executing image processing in a mode limited to classes that are predicted in accordance with the conditions in the acquired image P. Additionally, in the case in which the sensor 52 is a sensor for detecting the state of a moving body, image processing can be executed more efficiently by executing image processing in a mode limited to classes that are predicted in accordance with the position or the direction in which the moving body is oriented.

Figure 8:
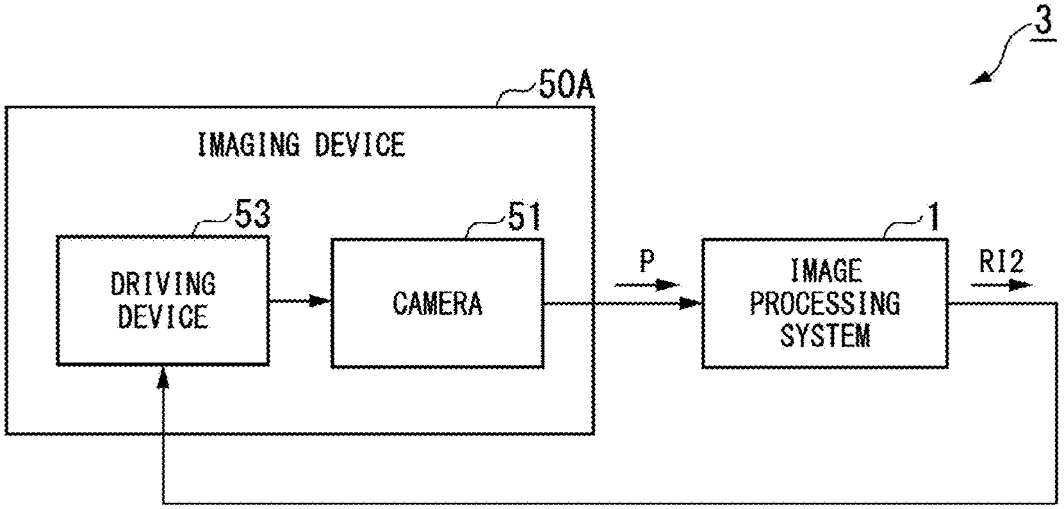
FIG. 8 is a diagram for explaining a summary of a modified example of the imaging system according to an embodiment.

FIG. 8 is a diagram for explaining a summary of a modified example of the imaging system according to an embodiment. An example of the imaging system 3 will be explained with reference to said drawing. The imaging system 3 captures images of targets by being provided with an imaging device, analyzes the captured images by means of the image processing system 1, and controls the imaging device based on the analyzed results.

The imaging system 3 is provided with an image processing system 1 and an imaging device 50A. The imaging device 50A is provided with a camera 51 and a driving device 53.

The camera 51 captures images of targets. The targets broadly include things that are detectable by image processing, such as animals and objects.

The driving device 53 controls imaging conditions such as the imaging direction, the angle of view, and the imaging magnification of the camera 51. Additionally, in the case in which the imaging system 3 is used on a moving body such as a drone or an AGV, the driving device 53 controls the movement of the moving body such as the drone or the AGV.

The image processing system 1 calculates the second correspondence information group RI2 based on the image P captured by the imaging device 50A. The image processing system 1 outputs the calculated second correspondence information group RI2 to the imaging device 50A. The driving device 53 controls the imaging conditions of the camera 51 and the movement of the moving body based on the acquired second correspondence information group RI2.

For example, in the case in which the imaging system 3 is used in a monitoring camera, if a class of a person predicted to be a criminal and positional coordinates are identified from the second correspondence information group RI2, the imaging device 50A can control the imaging direction, the angle of view, the imaging magnification, etc. of the imaging device 50A so as to track the criminal. Additionally, in the case in which the imaging system 3 is used in a moving body such as a drone or an AGV, the driving device 53 can control the movement so as to track the person predicted to be a criminal while capturing images. Additionally, the class identified by the second correspondence information group RI2 can be displayed on a display unit, etc., and data including the second correspondence information group RI2 can be transferred to and collected in an external server device, thereby allowing the data to be used by various applications.

Summary of Embodiment

According to the embodiment explained above, the image processing system 1 is provided with a preprocess 10 and a postprocess 30. The image processing system 1 calculates, by means of the preprocess 10, which is realized by hardware such as an FPGA, multiple boundary box candidates and likelihoods of classes corresponding to the respective boundary boxes. Additionally, the image processing system 1 identifies, by means of the postprocess 30 realized by software, likely bounding boxes among the calculated candidates, and classes corresponding to the bounding boxes. Therefore, according to the present embodiment, the process for extracting bounding box candidates, which requires a large amount of processing, is performed by hardware, and the process for identifying likely bounding boxes and classes among the extracted candidates is performed by software.

Thus, according to the present embodiment, by selecting whether to prioritize accuracy or to prioritize speed in the processing by the software, the types of objects included in images can be detected with appropriate processing speed and accuracy.

In the case in which the preprocess 10 includes DNNs, the parameters thereof are determined in advance by training using teacher data. The training is preferably performed not only in the preprocess 10, but also in the postprocess 30. For this reason, since the postprocess 30 of the present embodiment is provided with multiple computation units, training must be performed in each computation unit. However, in the case in which a lot of time is required for the training, the training may be limited to just some of the computation units. In the present embodiment, decreases in accuracy when prioritizing speed can be suppressed by implementing training using an accuracy-prioritizing computation unit.

Additionally, according to the embodiment explained above, the postprocess 30 acquires the first correspondence information group RI1 by providing the correspondence information acquisition unit 310, and acquires the settings information SI by providing the settings information acquisition unit 320. The postprocess 30, by being provided with the extraction unit 330, extracts the second correspondence information group RI2 based on the acquired first correspondence information group RI1 and the settings information SI. That is, the extraction unit 330 performs image processing based on information set by the settings information SI. Therefore, according to the present embodiment, the postprocess 30 can easily detect the types of objects included in images with appropriate processing speed and accuracy.

In particular, in the case in which a hardware accelerator for executing the preprocess 10 uses DNNs quantized to 8 or fewer bits, the image processing method described in the present embodiment is preferably applied. More specifically, by computing the quantized DNNs on the accelerator, both the processing speed and the accuracy can be better established than in the case of processing with a multi-bit fixed decimal point. However, since the output from the postprocess 30 is processed in a later stage, it is preferable to implement the processing with the multi-bit fixed decimal point, and this processing presents a large problem in edge devices in which the processing computational power of the processors is low. The effects of using an accelerator for processing in the preprocess 10 are thus reduced. In contrast therewith, the extraction unit 330 performs image processing based on information set by the settings information SI. Therefore, according to the present embodiment, the postprocess 30 can easily detect the types of objects included in images with appropriate processing speed and accuracy.

Additionally, according to the embodiment explained above, the settings information SI includes at least information indicating either the accuracy-prioritizing first setting or the processing speed-prioritizing second setting. Therefore, according to the present embodiment, a user of the image processing system 1 can easily set whether to prioritize the accuracy or the processing speed. Additionally, according to the present embodiment, the user can arbitrarily switch whether to prioritize the accuracy or the processing speed.

Additionally, according to the embodiment explained above, in the postprocess 30, the number of classes to be computed in the first setting is different from the number of classes to be computed in the second setting. Additionally, the number of classes to be computed in the first setting is larger than the number of classes to be computed in the second setting. That is, according to the present embodiment, the number of classes to be computed is changed to switch between whether to prioritize the accuracy or the processing speed. Therefore, according to the present embodiment, the postprocess 30 can easily switch between prioritizing the accuracy or the processing speed.

Additionally, according to the embodiment explained above, the postprocess 30 uses different computation units between the case of the first setting and the case of the second setting. That is, the extraction unit 330 prepares two different computation units, and the switching unit 332 switches the computation unit used for computation. In other words, the postprocess 30 has a program used in the case of the first setting and a program used in the case of the second setting, and the switching unit 332 switches the programs based on the settings information SI. Therefore, according to the present embodiment, it is possible to quickly switch between the first setting and the second setting.

Additionally, according to the embodiment explained above, the extraction unit 330A, by being provided with the compression unit 331, compresses the first correspondence information group RI1 calculated by the preprocess 10 by means of a method such as max pooling. The computation unit performs computations based on the compressed first correspondence information group RI1. Therefore, according to the present embodiment, unnecessary processes can be eliminated and the processing speed can be easily raised.

Additionally, according to the embodiment explained above, in the case in which there are few classes, the compression unit 331 compresses the first correspondence group RI1 calculated by the preprocess 10 by a method such as max pooling in a stage before the postprocess. Therefore, according to the present embodiment, image processing can be performed at a high speed.

Additionally, according to the embodiment explained above, the postprocess 30 acquires the settings information SI at the time of activation. Therefore, according to the present embodiment, the postprocess 30 can easily switch between prioritizing the accuracy or the processing speed.

Additionally, according to the embodiment explained above, the settings information acquisition unit 320 acquires the settings information SI from the settings file SF. Therefore, according to the present embodiment, the postprocess 30 can easily switch between prioritizing the accuracy or the processing speed by means of user settings.

Additionally, according to the embodiment explained above, the settings information acquisition unit 320 acquires the settings information SI based on the first correspondence information group RI1. Therefore, according to the present embodiment, even in the case in which settings information SI has not been set by the user, image processing can be performed based on the first correspondence information group RI1 with appropriate accuracy or processing speed.

Additionally, according to the embodiment explained above, the image processing system 1 performs software processing on the image P before the image P is input to the preprocess 10. The image processing performed by the image processing system 1 is, for example, processing for improving the image quality, processing of the image itself, other data processes, etc. In this case, when the preprocess 10 is configured from hardware such as an FPGA, there are cases in which the preprocess 10 cannot process the image P, depending on the image quality, the image size, the image format, etc. of the image P. Therefore, according to the present embodiment, software processing is performed on the image P before the image P is input to the preprocess 10, thereby allowing the image P to be processed by the preprocess 10 and the postprocess 30 regardless of the image quality, the image size, the image format, etc. of the image P.

In this case, according to the conventional art, there are cases in which the inference accuracy is reduced when there is a change in the image quality, the image size, the image format, etc. of the input image in comparison with the conditions at the time of training.

However, according to the present embodiment, the image processing system 1 performs software processing on the image P before the image P is input to the preprocess 10. Thus, there is no need for performing retraining anew in accordance with the image quality, the image size, the image format, etc. that have been changed. Therefore, according to the present embodiment, the inference accuracy can be kept from becoming lower even if there has been a change in the image quality, the image size, the image format, etc. of an input image.

Additionally, the image processing system 1 may perform software processing on the image P in accordance with changes in the types of images appearing in the image P (for example, changes caused by changes in the imaging targets, by changes in the imaging environment, by changes in the imaging conditions, etc.). In this case, the image processing system 1 may acquire information regarding changes in the imaging targets, changes in the imaging environment, changes in the imaging conditions, etc. from a sensor, etc., not illustrated, and may perform software processing on the image P in accordance with the acquired conditions. The image processing system 1 can make even more accurate inferences by performing favorable software processing on the image P before the image P is input to the preprocess 10.

As the present embodiment, an example in which the number of classes to be computed or the types of classes differ in accordance with whether each of the computation units is to prioritize the detection accuracy or the processing speed was indicated. However, instead of the detection accuracy or the processing speed, the switching targets may be computation units with low power consumption. In other words, in order to appropriately execute the required processes, it is preferable to switch, as appropriate, processes in which there is a tradeoff relationship.

All or some of the functions of the respective units provided in the image processing system 1 in the above-mentioned embodiment may be realized by recording a program for realizing these functions on a computer-readable recording medium, and having the program recorded on this recording medium be read and executed by a computer system. In this case, the "computer system" includes an OS and hardware such as peripheral devices.

Additionally, the "computer-readable recording medium" refers to a portable medium such as a flexible disk, a magneto-optic disk, a ROM, or a CD-ROM, or to a storage unit such as a hard disk internal to the computer system. Furthermore, the "computer-readable recording medium" may include media that dynamically hold the program for a brief period of time, such as communication lines in the case in which the program is transmitted via a network like the internet, and media that hold the program for a certain period of time, such as volatile memory inside a computer system functioning as a server or a client in such cases. Additionally, the above-mentioned program may be for realizing just some of the aforementioned functions, and furthermore, the aforementioned functions may be realized by being combined with a program already recorded in the computer system.

Although modes for carrying out the present invention have been explained by describing embodiments above, the present invention is not limited to such embodiments, and various modifications and substitutions may be made within a range not departing from the spirit of the present invention.

REFERENCE SIGNS LIST

1 Image processing system
10 Preprocess
30 Postprocess
310 Correspondence information acquisition unit
320 Settings information acquisition unit
330 Extraction unit
340 Output unit
331 Compression unit
332 Switching unit
333 First computation unit
334 Second computation unit
335 Computation result output unit
2 Imaging system
50 Imaging device
51 Camera
52 Sensor
53 Driving device
P Image
RI1 First correspondence information
RI2 Second correspondence information
O Object detection result
ID Input device
SF Settings file
SI Settings information

The invention claimed is:

1. An image processing device that detects, by image processing, types of objects included in an image and positional coordinates at which the objects are located, the image processing device being provided with:

a correspondence information acquisition unit that acquires a first correspondence information group including multiple items of correspondence information in which positional coordinates indicating ranges in which objects are predicted to be located in the image are associated with likelihoods of classes, among multiple predefined classes, corresponding to the ranges;

a settings information acquisition unit that acquires settings information relating to the image processing;

an extraction unit that extracts, based on the acquired first correspondence information group and the acquired settings information, a second correspondence information group including at least one or more likely classes and positional information corresponding to the likely classes; and an output unit that outputs the extracted second correspondence information group, wherein the settings information includes at least information indicating either a first setting for prioritizing accuracy of the classes and the positional coordinates extracted by the extraction unit, or a second setting for prioritizing a processing speed of the extraction unit, wherein, in the process by which the extraction unit extracts the second correspondence information group, the number of the classes to be computed when the settings information indicates the second setting is less than the number of the classes to be computed when the settings information indicates the first setting.

2. The image processing device according to claim 1, wherein:

the settings information acquisition unit acquires the settings information from a settings file.

3. The image processing device according to claim 1, wherein:

the settings information acquisition unit acquires the settings information based on the first correspondence information group acquired by the correspondence information acquisition unit.

4. An image processing system provided with:

a preprocessing device that calculates a first correspondence information group including multiple items of correspondence information in which positional coordinates indicating ranges in which objects are predicted to be located in the image are associated with likelihoods of classes, among multiple predefined classes, corresponding to the ranges; and the image processing device according to claim 1, which acquires the first correspondence information group from the processing device.

5. An image processing method for detecting, by image processing, types of objects included in an image and positional coordinates at which the objects are located, the image processing method comprising:

acquiring a first correspondence information group including multiple items of correspondence information in which positional coordinates indicating ranges in which objects are predicted to be located in the image are associated with likelihoods of classes, among multiple predefined classes, corresponding to the ranges;

acquiring settings information relating to the image processing;

extracting, based on the acquired first correspondence information group and the acquired settings information, a second correspondence information group including at least one or more likely classes and positional information corresponding to the likely classes; and outputting the extracted second correspondence information group, wherein the settings information includes at least information indicating either a first setting for prioritizing accuracy of the classes and the positional coordinates extracted by the extraction unit, or a second setting for prioritizing a processing speed of the extraction unit, wherein, in the process by which the extraction unit extracts the second correspondence information group, the number of the classes to be computed when the settings information indicates the second setting is less than the number of the classes to be computed when the settings information indicates the first setting.

6. A computer-readable recording medium that includes a program for detecting, by image processing, types of objects included in an image and positional coordinates at which the objects are located that, when executed, causes a computer to:

acquire a first correspondence information group including multiple items of correspondence information in which positional coordinates indicating ranges in which the objects are predicted to be located in the image are associated with likelihoods of classes, among multiple predefined classes, corresponding to the ranges;

acquire settings information relating to the image processing;

extract, based on the acquired first correspondence information group and the acquired settings information, a second correspondence information group including at least one or more likely classes and positional information corresponding to the likely classes; and output the extracted second correspondence information group, wherein the settings information includes at least information indicating either a first setting for prioritizing accuracy of the classes and the positional coordinates extracted by the extraction unit, or a second setting for prioritizing a processing speed of the extraction unit, wherein, in the process by which the extraction unit extracts the second correspondence information group, the number of the classes to be computed when the settings information indicates the second setting is less than the number of the classes to be computed when the settings information indicates the first setting.

7. An image processing device that detects, by image processing, types of objects included in an image and positional coordinates at which the objects are located, the image processing device being provided with:

a correspondence information acquisition unit that acquires a first correspondence information group including multiple items of correspondence information in which positional coordinates indicating ranges in which objects are predicted to be located in the image are associated with likelihoods of classes, among multiple predefined classes, corresponding to the ranges;

a settings information acquisition unit that acquires settings information relating to the image processing;

an extraction unit that extracts, based on the acquired first correspondence information group and the acquired settings information, a second correspondence information group including at least one or more likely classes and positional information corresponding to the likely classes; and an output unit that outputs the extracted second correspondence information group, wherein the settings information includes at least information indicating either a first setting for prioritizing accuracy of the classes and the positional coordinates extracted by the extraction unit, or a second setting for prioritizing a processing speed of the extraction unit, wherein the extraction unit is further provided with a switching unit that, based on the settings information, switches between a first computation unit that performs computations for extracting the second correspondence information group when the settings information indicates the first setting and a second computation unit that performs computations for extracting the second correspondence information group when the settings information indicates the second setting.

8. The image processing device according to claim 7, wherein:

the extraction unit is further provided with a compression unit that, by a prescribed method, compresses the classes included in the first correspondence information group to specific classes; and the first computation unit or the second computation unit performs computations for extracting the second correspondence information group based on the compressed correspondence information.

9. The image processing device according to claim 8, wherein:

the compression unit compresses the correspondence information included in the first correspondence information group when there is a prescribed value or fewer of classes for which the likelihoods of the multiple items of correspondence information included in the first correspondence information group is a prescribed value or higher.

10. The image processing device according to claim 7, wherein:

the switching unit is switched based on the settings information when the image processing device is activated.

* * * * *